United States Patent [19]

Saaty

[11] Patent Number: 4,668,096

[45] Date of Patent: May 26, 1987

[54] METHOD FOR BRINGING A MATERIAL TO AN OPERATIVE MELTED STATE AND DEVICE FOR DOING SAME

[75] Inventor: Samir Saaty, Orange, Conn.

[73] Assignee: The Upjohn Company, Kalamazoo, Mich.

[21] Appl. No.: 752,304

[22] Filed: Jul. 3, 1985

[51] Int. Cl.[4] .............................................. B29B 1/00
[52] U.S. Cl. ...................................... 366/98; 366/100; 366/601; 366/142; 366/144
[58] Field of Search ...................... 366/142, 69, 76, 77, 366/78, 97, 98, 99, 100, 348, 349, 601, 144, 145; 425/200, 207, 208, 209

[56] References Cited

U.S. PATENT DOCUMENTS

| | | | |
|---|---|---|---|
| 2,100,893 | 11/1937 | Anderson | 175/294 |
| 3,405,318 | 10/1968 | Gilker | 317/22 |
| 3,416,035 | 12/1968 | Lipnitz | 317/22 |
| 3,440,491 | 4/1969 | Tenenbaum et al. | 317/22 |
| 3,637,111 | 1/1972 | McCreary | 222/146 |
| 4,002,891 | 1/1977 | Porter | 366/98 |
| 4,120,051 | 10/1978 | Lohning | 366/142 |
| 4,362,033 | 12/1982 | Young | 366/142 |
| 4,403,867 | 9/1983 | Duke | 366/142 |
| 4,436,431 | 3/1984 | Strong | 366/142 |

*Primary Examiner*—Robert W. Jenkins
*Attorney, Agent, or Firm*—St. Onge Steward Johnston & Reens

[57] ABSTRACT

A start-up process is provided for bringing a material to an operative melted condition while the material is being heated, including the steps of attempting to agitate the material, sensing whether resistance to agitation is excessive, deactivating the attempts if excessive resistance is encountered, reactivating the attempt after a preselected time period, and repeating the foregoing steps until the operative melted condition has been reached or the deactivation step has occurred a predetermined number of times. Also provided is a device for practicing the above method, comprising a sensing means for sensing excessive resistance, a switching means for deactivating the attempt to agitate, and a timing means for reactivating the attempt to agitate after a predetermined time period.

10 Claims, 3 Drawing Figures

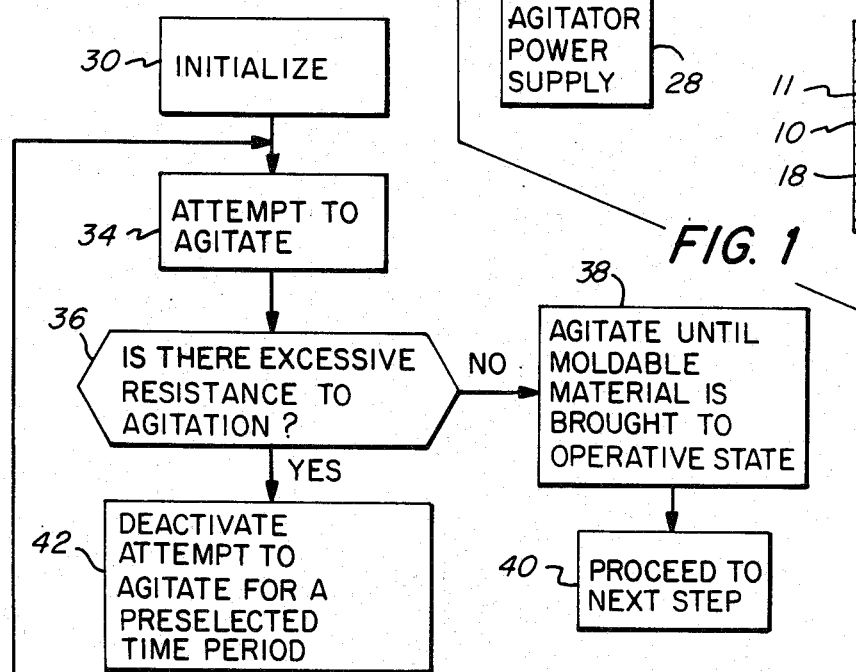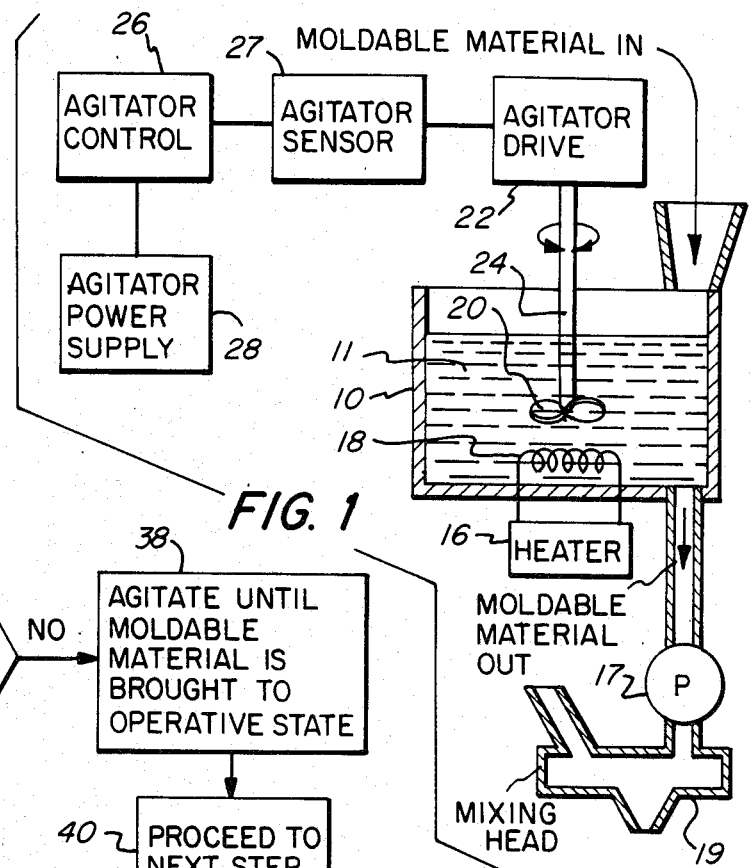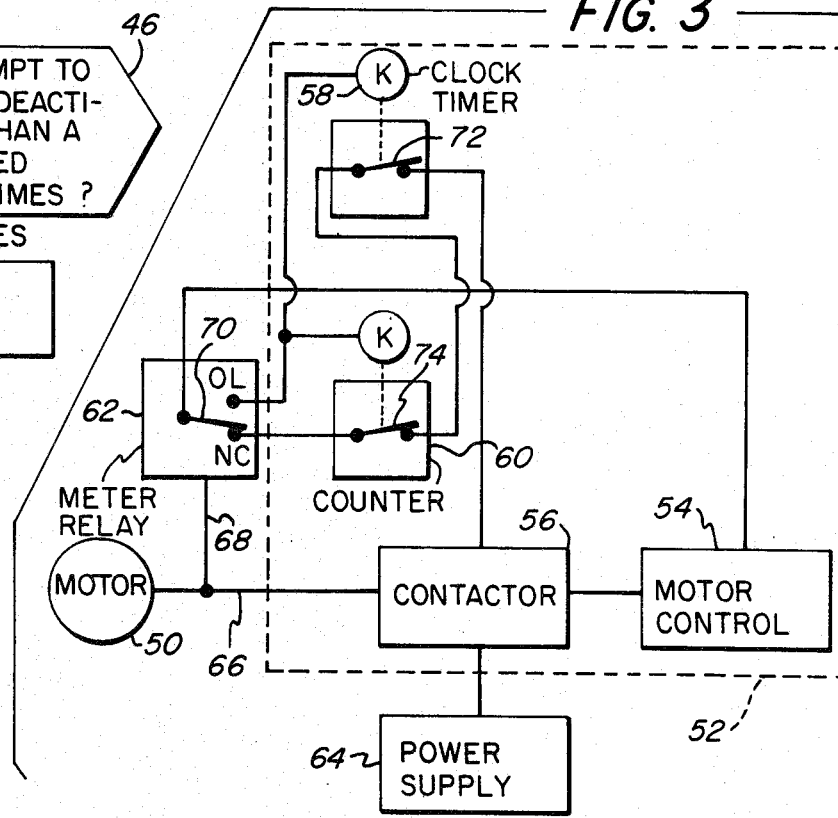

METHOD FOR BRINGING A MATERIAL TO AN OPERATIVE MELTED STATE AND DEVICE FOR DOING SAME

BACKGROUND OF THE INVENTION

The present invention relates to a method and apparatus for bringing a material having a melting point to an operative melted condition where it can be processed.

It is often desirable to bring a material, such as the caprolactum or diphenylmethane diisocyanate used in a reaction injection molding process, from a solid state at room temperature to an operative melted condition suitable for molding. The material is placed in a tank and heated to the melting point. The material should be agitated as soon as melting begins in order to establish an even temperature throughout the material, to avoid overheating at isolated regions, to avoid degradation of material in contact with the tank walls, and to speed up the melting process.

A tank agitator ordinarily driven by an electric motor is disposed in the tank for agitating the moldable material. If the agitator is activated too long after melting occurs, the moldable material may overheat or degrade. Also, the melting process may not take place as quickly in the absence of agitation. However, if the agitator is prematurely activated before sufficient melting has occurred, the tank agitator may encounter excessive resistance to agitation, thereby overloading or even stalling and damaging the agitator drive, especially if the drive is an electric motor.

Electrical control circuits for sensing overloads are known in the prior art. For example, U.S. Pat. Nos. 3,405,318 to Gilker, 3,416,035 to Lipnitz, and 3,440,491 to Tenenbaum et al. all disclose circuit breakers or interrupters where the breaker is tripped in response to an overload and is then reclosed after a time delay. The circuit breaker may be tripped and reclosed a certain number of times before it is locked out in an open condition. However, none of these references suggest how a moldable material may be brought to an operative melted condition.

SUMMARY OF THE INVENTION

With a method and apparatus in accordance with the invention, a material that is a solid at room temperature can be brought to an operative melted condition in an efficient and safe manner. This is obtained as described in an embodiment of the present invention.

The method or start-up process includes the steps of attempting to agitate the material, sensing when resistance to agitation exceeds a predetermined reference level, and deactivating the attempt to agitate for a preselected time period if excessive resistance to agitation is encountered. After waiting for a preselected time period, the attempt to agitate is reactivated. After a predetermined number of deactivations has occurred, the start-up process is terminated. Thus, a series of on-off cycles is carried out until either the material reaches its operative melted condition or a predetermined number of on-off cycles have been completed.

The present invention is also directed to a device for carrying out this method, where the device comprises a sensing means for detecting an overload condition in the agitator drive, a switching means for deactivating the agitator drive when an overload condition is sensed, and a timing means responsive to the sensing means for reactivating the agitator drive after a preselected time period has elapsed from the sensing of the overload condition. Also provided is a means for counting the number of on-off cycles and disabling the agitator drive after a predetermined number of on-off cycles have occurred.

The advantages of the present invention reside in the fact that the material can be brought to its operative melted condition without overloading the agitator drive and also without constant supervision of a technician or operator. If the number of attempted agitation steps exceeds a preselected number, the start-up process is halted until the operator reactivates the device.

Accordingly, it is an object of the present invention to provide a method for bringing a material to an operative melted condition by repeated attempts to agitate the material while heating the material.

It is a further object of this invention to disclose such a method wherein the repeated attempts to agitate are stopped after a predetermined number of attempts.

It is still a further object of the present invention to provide a device for carrying out such a method.

The invention, together with further objects and attendant advantages, will be best understood by reference to the following detailed description of the preferred embodiments taken in conjunction with the accompanying drawings.

BRIEF DESCRIPTION OF THE DRAWINGS

FIG. 1 is a block diagram depicting the system to which the method of the present invention is applied;

FIG. 2 is a flow diagram setting forth the method of the present invention; and

FIG. 3 is a block diagram showing a device for practicing the method of the present invention.

DETAILED DESCRIPTION OF THE DRAWINGS

FIG. 1 is a block diagram showing a tank 10 into which the material 11 is placed. The material may be any composition, such as caprolactum or diphenylmethane diisocyanate (MDI), which is highly viscous at a lower, or room temperature. The material may be so viscous as to be a solid. This composition may be placed into the tank 10 in the form of solid chunks, flakes, powder, or a viscous liquid. Until the composition has been heated to approximately 200° Fahrenheit, which is the approximate melting point for caprolactum or MDI, no agitation or stirring is possible.

In another situation commonly encountered, the composition may have been heated to a liquid state and then poured into tank 10. However, if the machine is shut down, such as for example over the weekend, the composition will solidify and agitation is not possible until heat has again been applied and the melting point is reached. Tank 10 has a means for applying heat, such as heater 16 and heating coil 18, for raising the temperature of the contents 11 of tank 10. When the composition has been brought to the operative melted condition, it is then driven under nitrogen pressure to a cylinder pump 17 for forcing the material through the processing or mixing heads 19.

The composition, once it has reached a sufficiently high temperature to be melted, can be agitated by agitator 20, which comprises any means for stirring, mixing, or otherwise agitating the contents of tank 10. Agitator 20 can be a paddle wheel, blades mounted on a shaft, a shaker or other means well known to those of skill in the art. Agitator 20 is driven by agitator drive 22, which is joined to agitator 20 by shaft 24. Agitator drive 22 may comprise any means for supplying kinetic energy to agitator 20, and as such could be any prime mover, including for example an a.c. or d.c. electric motor. The agitator drive 22 is controlled by agitator control 26, the structure of which is determined by the nature of the agitator drive 22. If the agitator drive 22 is an electric motor, then agitator control 26 would use appropriate electrical control circuitry for controlling agitator drive 22. As will be described more fully below, agitator sensor 27 is provided for sensing when the agitator drive is overloaded because the composition has not yet reached the melted state where it can be agitated. Agitator power supply 28 provides energy, such as electrical energy, for the agitator drive 22.

FIG. 2 depicts a method or start-up process for operating the tank agitator system of FIG. 1 to bring a solid or highly viscous material placed therein to an operative melted condition, such as that suitable for molding.

Box 30 in FIG. 2 represents the beginning point of the method of the present invention, where the system is initialized by putting the material 11 into the tank 10 and activating heater 16 so that the temperature of the material 11 is raised. After a relatively short period of time, an attempt to agitate the material is made at 34. This is typically done by activating the agitator 20, such as by applying electrical power to an agitator drive 22.

While the attempt to agitate is being made, or relatively shortly thereafter, the next step is to sense whether excessive resistance to agitation is present, as represented by box 36. If the material has not yet reached its melting point, then the agitator 20 may be difficult or perhaps even impossible to drive. This sensing step 36 can be implemented by observing whether the agitator 20 is failing to operate or, alternatively, by sensing whether the electrical current supplied to agitator drive 22 is excessive or is greater than a standard reference.

If no such excessive resistance is encountered, the agitation step can be continued as indicated at 38 until the material has been brought to the operative state. This can be determined by visual observation or by removing a sample of the material 11 from the tank 10 for testing. Thereafter as shown at 40, the next processing step, such as pumping the moldable material 11 to a mixing head 19, can be carried out.

However, if excessive resistance is sensed by the sensor 27, the attempt to agitate is deactivated for a preselected time period at 42. This time period is selected depending upon the characteristics of the tank agitator 20 and the material 11 therein. For example, if the heat is being applied at a relatively high rate or if the material tends to degrade in a relatively short period of time, then the time period should be relatively short.

At the expiration of the preselected time period, a determination is made as to whether the attempt to agitate has been deactivated more than a predetermined number of times, as seen at 46 in FIG. 2. If the attempt step has in fact been deactivated more than the predetermined number of times, the method proceeds to 48 where it is stopped indefinitely and the operator must reset the system. This step represented at 46 prevents the agitator drive 22 from being excessively cycled on and off.

If the attempt step has been deactivated less than the predetermined number of times, the process loops back to 34 where steps 34, 36, 42, and 46 are repeated until either a predetermined number of on-off cycles have occurred or the material has been brought to its operative melted state.

An alternate method eliminates the step at 46, so that the agitator drive 22 is cycled on and off without any limit to the number of on-off cycles. With this alternative, the method loops back to 34 after step 42 has been carried out.

A device for carrying out the method of the present invention is disclosed by way of example only in FIG. 3. FIG. 3 shows the agitator drive 22 as electric motor 50, for driving the tank agitator 20 depicted in FIG. 1. The agitator control 26 of FIG. 1, indicated by dotted lines 52, comprises a motor control 54, a contactor 56, a clock-timer 58, and a cycle counter 60. Agitator sensor 27 of FIG. 1 corresponds to meter relay 62. Power supply 64 corresponds to the agitator power supply 28 of FIG. 1.

In FIG. 3, motor 50 is a 480 volt, 3-phase electric motor. Contactor 56 is a magnetic relay that can be closed by a 110 volt control signal on line 72 from motor control 54, so that electrical power from power supply 64 is supplied to motor 50 through line 66.

Sensing means for detecting an overload condition in motor 50 is provided by the meter relay 62. Through line 68, the meter relay 62 constantly monitors the magnitude of the electrical current being supplied motor 50 through line 66. If motor 50 becomes overloaded, such as when agitator 20 cannot be driven, the electric current in line 66 will increase. Meter relay 62 constantly compares the current in line 66 with a predetermined reference level.

When meter relay 62 detects the presence of an agitator drive overload condition, in that the current has exceeded the reference level, a switching means 70 coupled to the sensing means of the meter relay 62 deactivates the motor 50. Switching means 70 is momentarily moved from the normally closed position (N.C.) to the overload position (O.L.). Moving to O.L. activates the clock-timer 58, which begins to measure a time out or preselected time period and also which simultaneously opens the set of switch contacts 72, thereby disconnecting or deactivating the contactor 56 and stopping motor 50. Therefore, although the switch 70 returns to the N.C. position, the circuit remains open through open switch 72.

At the end of the preselected time period, the clock-timer 58 times out and recloses switch 72, thereby reactivating the motor 50 through contactor 56. This cycle can be repeated, so that motor 50 or agitator drive 22 is periodically cycled on and off until the moldable material 11 reaches the condition where the agitator 20 can be driven to mix the material 11.

When the meter relay 62 senses an overload condition and switch 70 moves momentarily to the O.L. position, counter 60 is activated so that it is incremented by one. Counter 60 will be incremented by one each time an overload condition is sensed by relay 62. In this manner, means is provided for counting the number of times the meter relay 70 deactivates the agitator drive. Counter 60 can be set to permit a predetermined number of on-off cycles, such that if this number is exceeded the counter 60 will produce a signal which will open switch contacts 74, which remain open indefinitely thereby shutting down motor 50 and disabling the agitator drive until the operator manually resets the drive.

The device described above can be constructed several different ways with standard components well known to those of skill in the art. A Type 195 Meter Relay manufactured by General Electric Company, an electro-mechanical counter known as the MV 5 13.21/2 manufactured by Kessler-Ellis products, and an electro-mechanical GP2-15M interval timer manufactured by Industrial Timer Company are particularly preferred in the device of the present invention.

It is also understood that the device can be constructed using the many solid state or semiconductor components well known in the art. Boxes 34, 36, 38, 40, 42, 46, and 48 of FIG. 2 can easily be translated by means well known to those of skill in the art to a device wherein each of the instructions of each box can be implemented by a suitable circuit device or devices. Furthermore, the method disclosed in FIG. 2 can be translated into a computer program for use with a computer device for carrying out the disclosed method.

It should be understood that various changes and modifications to the preferred methods and embodiments described above will be apparent to those of skill in the art. Such changes and modifications can be made without departing from the spirit and scope of the present invention, and it is therefore intended that such changes and modifications be covered by the following claims.

I claim:

1. A start-up process for bringing a highly viscous material used for molding to an operative melted condition while the material is being heated, the method
   (a) attempting to agitate the material;
   (b) sensing when resistance to agitation exceeds a predetermined reference level;
   (c) deactivating the attempt to agitate for a preselected time period if excessive resistance to agitation is sensed;
   (d) reactivating the attempt to agitate after the preselected time period; and
   (e) repeating said steps until the material is brought to the operative melted state for molding.

2. The start-up process of claim 1 further comprising the step of stopping agitation when the moldable material is brought to the operative state.

3. The start-up process of claim 1, and further comprising the step of terminating the start-up process after a predetermined number of attempts to agitate.

4. The start-up process of claim 1, wherein the sensing step comprises sensing the overload condition of the motor used to drive the agitator.

5. A process for bringing a moldable material from a lower temperature state to an operative melted condition for use in injection molding, the method comprising:
   (a) heating the moldable material;
   (b) activating an attempt to agitate the moldable material;
   (c) sensing when resistance to agitation of the moldable material exceeds a predetermined reference level;
   (d) deactivating the attempt to agitate the moldable material for a preselected time period; and
   (e) repeating said steps, whereby the moldable material is subjected to a series of activation-deactivation cycles until the moldable material is brought to the operative melted condition.

6. The process of claim 5, wherein the moldable material is caprolactum.

7. The process of claim 6, wherein the moldable material is diphenylmethane diisocyanate.

8. A control for a tank agitator operated by an agitator drive in which a material is to be brought by heating from a state where operation of the agitator would tend to cause an overload to a condition where the agitator can be driven to mix the material, the control comprising;
   (a) sensing means for detecting an overload condition in the agitator drive;
   (b) switching means coupled to the sensing means for deactivating the agitator drive when the sensing means detects the presence of an agitator drive overload condition; and
   (c) timing means responsive to said sensing means when it detects an overload condition in the agitator drive for reactivating the agitator drive after a preselected time period, so that the agitator drive is periodically cycled on and off until the material reaches the condition where the agitator can be driven to mix the material.

9. The control of claim 8, further comprising means for disabling the agitator drive after a predetermined number of on-off cycles have occurred.

10. The control of claim 9, wherein the disabling means comprises means for counting the number of times the means deactivates the agitator drive, a means for producing a signal after the counting means has counted a predetermined number of times, and means responsive to said signal for disabling the agitator drive.

* * * * *